United States Patent [19]

Suzuki et al.

[11] 4,172,171

[45] Oct. 23, 1979

[54] MAGNETIC RECORDING MEDIUM

[75] Inventors: Masaaki Suzuki; Ryuji Shirahata, both of Odawara, Japan

[73] Assignee: Fuji Photo Film Co., Ltd., Minami-ashigara, Japan

[21] Appl. No.: 848,770

[22] Filed: Nov. 4, 1977

[30] Foreign Application Priority Data

Nov. 12, 1976 [JP] Japan ................................ 51-135195

[51] Int. Cl.$^2$ ........................ B32B 7/00; C23C 13/06; G11B 5/74
[52] U.S. Cl. .................................. 428/216; 360/131; 360/134; 360/135; 360/136; 427/12; 427/131; 427/132; 427/250; 428/900; 428/469
[58] Field of Search ............... 360/131, 134, 135, 136; 427/131, 132, 12, 248 R, 250, 255; 428/212, 213, 215, 216, 900, 332, 334, 335, 336

[56] References Cited

U.S. PATENT DOCUMENTS

| 2,691,072 | 10/1954 | Mathes ............................ 427/131 X |
| 3,761,311 | 9/1973 | Perrington et al. ............. 428/332 X |
| 4,075,384 | 2/1978 | Suzuki et al. ....................... 428/212 |

FOREIGN PATENT DOCUMENTS 1427731  3/1976  United Kingdom .................... 427/132

*Primary Examiner*—George F. Lesmes
*Assistant Examiner*—Bruce H. Hess
*Attorney, Agent, or Firm*—Armstrong, Nikaido, Marmelstein & Kubovcik

[57] ABSTRACT

This invention relates to a magnetic recording medium which comprises a non-magnetic support, at least one magnetic recording layer containing a magnetic powder and a binder and being provided on the support and a ferromagnetic metal thin film with a thickness of at most 1 micron, being provided on the magnetic recording layer by an oblique incidence vapor deposition method with an electric field. This multi-layer magnetic recording medium exhibits various excellent magnetic recording performances.

16 Claims, No Drawings

MAGNETIC RECORDING MEDIUM

BACKGROUND OF THE INVENTION

1. Field of the Invention

This invention relates to a magnetic recording medium and more particularly, it is concerned with a multi-layer magnetic recording medium with improved magnetic recording performances.

2. Description of the Prior Art

As a magnetic recording medium there have hitherto been used those having magnetic recording layers of coating type consisting mainly of ferromagnetic powders and binders. However, this magnetic recording medium has the disadvantage that the magnetic recording density cannot be increased because of having a large proportion of a non-magnetic portion in the magnetic recording layer.

In order to overcome this disadvantage, the inventors have made studies on a method of using a ferromagnetic metal thin film as a magnetic recording layer. In the case of forming a ferromagnetic metal thin film, plating methods such as electroplating, chemical plating and electroless plating and vapor deposition methods such as vacuum vapor deposition and sputtering are well known. The inventors have hitherto proposed the methods described in Japanese Patent Publication Nos. 5301/1966, 20386/1966, 23892/1968, 1126/1969, 6309/1969, 9490/1969, 15507/1969, 18038/1972 and 33161/1973 and Japanese Patent Application (OPI) Nos. 14326/1974, 45703/1974 and 57396/1974 as a method using electroplating or chemical plating, the methods described in Japanese Patent Application (OPI) Nos. 15999/1974, 75004/1975, 115507/1975 and 116330/1975 and Japanese Patent Application Nos. 126364/1974 and 125915/1975 as a method of using electroless plating and the method described in Japanese Patent Application (OPI) Nos. 75005/1975 and 123304/1975. Furthermore, the inventors have also proposed, as a method of forming a metal thin film more suitable for use as a magnetic recording layer, ionic plating methods and electric field vapor deposition methods, which correspond respectively to a modification of the vapor deposition method. That is to say, the methods described in Japanese Patent Application (OPI) Nos. 33806/1975, 115508/1975 and 119609/1975 have been proposed as the ionic plating method and the method described in Japanese Patent Application No. 61628/1975 has been proposed as the electric field vapor deposition method.

The magnetic recording media having the ferromagnetic metal thin films obtained by these methods as a magnetic recording layer are particularly suitable for short wavelength recording. However, these methods meet with the problem, on the other hand, that if a ferromagnetic metal thin film with a sufficient thickness to effect a long wavelength recording is provided, various hindrances such as deterioration of the magnetic properties, lowering of the adhesiveness to supports, lowering of the surface smoothness and increase of the production cost tend to occur.

As a magnetic recording medium having improved magnetic recording properties whereby the above described problem can be solved, there have been proposed magnetic recording media of multi-layer coating type having two or more magnetic recording layers, as disclosed in Japanese Patent Publication Nos. 2218/1962, 23678/1964, Japanese Patent Application (OPI) Nos. 31602/1972, 37903/1972, 31907/1973 and 31804/1975, U.S. Pat. Nos. 2,643,130, 2,647,954, 2,941,901 and 3,676,217 and DT-AS Nos. 1190985 and 1238072.

Of such multi-layer magnetic recording media, the following advantages are given in particular, where the uppermost layer is a ferromagnetic metal thin film.

(1) Since a ferromagnetic metal thin film is positioned near a head and the magnetic field produced by the head can thus be utilized effectively, a sufficient magnetic recording can be carried out with the commonly used recording current even if the coercive force is relatively increased and a short wavelength recording can favourably be carried out. In addition, the erasure by an erasing head can sufficiently be carried out.

(2) Since a ferromagnetic metal thin film can be used with a small thickness due to its high maximum residual magnetic flux density, the spacing loss resulting from departure of a coating type magnetic recording layer from a head can be minimized and the properties of the coating type magnetic recording layer can be taken out well by the usual recording and reproducing method.

(3) The level of a possible magnetic recording can be raised. In the recording of an audio signal, the maximum output level (MOL) is increased and in the recording of a video signal, the maximum output is increased.

(4) The abrasion resistance to a head can be improved.

(5) The demagnetization by magneto striction of a magnetic layer of binder type can be improved.

(6) When using the multi-layer magnetic recording medium as a magnetic recording tape, the resistance to bending as well as the durability of tape playing can be increased and troubles such as by disordered winding can be decreased.

(7) Adhesion of dusts and generation of noises due to static charge can be decreased.

(8) Contamination of a head due to powder scraping can be decreased.

(9) When using the multi-layer magnetic recording medium as a magnetic recording tape, a tape vibration and wow flutter due to tape elongation can be prevented.

(10) Since a ferromagnetic metal thin film is capable of giving sufficient effects with a small thickness, it can be produced with a relatively low cost.

In order to obtain the above described advantages by providing a ferromagnetic metal thin film on a magnetic recording layer of coating type, the ferromagnetic metal thin film must have an excellent surface smoothness as well as an excellent adhesiveness to the lower layer. When an ordinary magnetic recording layer of coating type consisting of a ferromagnetic powder and binder is subjected to a surface activating treatment by etching to give an anchor effect and to improve the adhesiveness and then to an electroless plating of a ferromagnetic metal thin film, for example, a smooth surface cannot be obtained and the adhesiveness to a layer under the ferromagnetic metal thin layer is often insufficient. Even by a method wherein a ferromagnetic metal thin film is provided by vapor deposition, the adhesiveness of the ferromagnetic metal thin film to the lower layer is not so improved and the above described advantages cannot be obtained.

SUMMARY OF THE INVENTION

It is an object of the invention to provide a magnetic recording medium with improved recording properties.

It is another object of the invention to provide a magnetic recording medium of multi-layer type having excellent magnetic recording properties.

These objects can be attained by a magnetic recording medium which comprises a non-magnetic support, one or more magnetic recording layers containing a magnetic powder and a binder and being provided on the support and a ferromagnetic metal thin film with a thickness of about 1 micron or less, being provided on the magnetic recording layer by an oblique incidence vapor deposition method with an electric field.

DETAILED DESCRIPTION OF THE INVENTION

We, the inventors, have made efforts to provide a magnetic recording medium capable of giving the advantages of a multi-layer magnetic recording medium with a ferromagnetic metal thin film as the uppermost layer and, consequently, have found that this object can be accomplished by providing a coating type magnetic recording layer on a non-magnetic support and providing a ferromagnetic metal thin film thereon by an oblique incidence vapor deposition with an electric field.

The vapor deposition method with an electric field comprises evaporating a ferromagnetic metal to be formed into a film from an evaporation source in a vacuum of $10^{-4}$ to $10^{-7}$ Torr, ionizing a part of the vapor, for example, by irradiating an electron beam and depositing a magnetic thin film on a substrate voltage-applied negatively to the evaporation source. In this method, ionized evaporated particles are accelerated by an electric field between an evaporation source and substrate and deposited on the substrate to form a thin film. In a case where the substrate is of an electrically non-conductive material as in the case of the present invention, it is effective to bring the substrate into close contact with a cathode plate or to provide a grid-shaped cathode over the surface of the substrate to face an evaporation source. The oblique incidence vapor deposition method with an electric field is a method wherein a substrate is arranged obliquely to an evaporation beam and the evaporation beam is made incident obliquely to the substrate to thus effect the vapor deposition, whereby a magnetic metal layer having very excellent magnetic properties and very excellent adhesiveness to a magnetic layer consisting of a magnetic powder and binder can be provided. For the purpose of forming a magnetic metal layer having a sufficient adhesiveness and coercive force required for the uppermost layer of a magnetic recording medium, in particular, it is preferable to use a substrate comprising a non-magnetic support and at least one magnetic recording layer containing a magnetic powder and binder and being provided on the non-magnetic support and to subject the same to a vapor deposition with an electric field in such a manner that the incident angle of an evaporation beam of ferromagnetic metal to the surface of the substrate be 50 degrees or more, preferably 60 to 80 degrees and the strength of the electric field between the substrate and evaporation source be 5 KV/m or more, preferably 8 to 30 KV/m. The incident angle described herein is an angle made by a normal to the surface of the substrate and an incident evaporation beam of ferromagnetic metal to the surface of the substrate. The thickness of the ferromagnetic metal layer provided as the uppermost layer is generally about 1 μm or less, preferably 0.03 to 1 μm, more preferably 0.05 to 0.5 μm. When such a ferromagnetic metal layer is provided with this thickness range, the advantages of a multi-layer magnetic recording medium having the uppermost layer of a ferromagnetic metal thin film, as described above, can sufficiently be exhibited.

The total thickness of the thus formed multiple magnetic recording layer is generally about 2 to 12 μm for an audio tape and about 1 to 6 μm for a video tape.

Furthermore, depending upon the use of a magnetic recording medium, the lower layer containing a magnetic powder and binder can be provided in two or more layers so as to increase more the properties as a multi-layer magnetic recording medium.

Useful examples of the ferromagnetic metal of the present invention are iron, cobalt, nickel and other ferromagnetic metals or magnetic alloys such as Fe-Co, Fe-Ni, Co-Ni, Fe-Si, Fe-Rh, Fe-V, Fe-Cu, Fe-Au, Co-P, Co-V, Co-Si, Co-Y, Co-La, Co-Ce, Co-Pr, Co-Sm, Co-Mn, Co-Pt, Ni-Cu, Co-Ni-Fe, Co-Ni-Ag, Co-Ni-Zn, Co-Si-Al, Fe-Ni-Cu, Fe-Si-Al, Mn-Bi, Mn-Sb and Mn-Al.

In particular, ferromagnetic metals containing at least one of iron, cobalt and nickel, the sum of these elements being at least 80% by weight based on the whole composition are preferably used.

The magnetic recording layer for the lower layer of the present invention can be obtained by kneading a ferromagnetic powder, binder, dispersing agent, lubricant, etc. with an organic solvent to prepare a magnetic coating composition and applying the coating composition to a non-magnetic support.

As the ferromagnetic powder for the lower layer, there can be used known ferromagnetic fine powders such as fine powders of $\gamma$-$Fe_2O_3$, Co-doped $\gamma$-$Fe_2O_3$, $Fe_3O_4$, Co-doped $Fe_3O_4$, $CrO_2$, Co-Ni-P alloys, Co-Ni-Fe alloys and the like, as disclosed in Japanese Patent Publication Nos. 14090/1969, 18372/1970, 28466/1971, 38755/1971, 4286/1972, 12422/1972, 17284/1972, 18509/1972, 18573/1972, 22062/1972 and 22513/1972.

Suitable binders which can be used in the present invention include hitherto known thermoplastic resins, thermosetting resins and mixtures thereof.

Suitable thermoplastic resins are those which have a softening point of about 150° C. or lower, a mean molecular weight of about 10,000 to 20,000 and a degree of polymerization of the order of about 100 to 2,000, for example, vinyl chloride/vinyl acetate copolymers, vinyl chloride/vinylidene chloride copolymers, vinyl chloride/acrylonitrile copolymers, acrylate/acrylonitrile copolymers, acrylate/vinylidene chloride copolymers, acrylate/styrene copolymers, methacrylate/acrylonitrile copolymers, methacrylate/vinylidene chloride copolymers, methacrylate/styrene copolymers, urethane elastomers, polyvinyl fluoride, vinylidene chloride/acrylonitrile copolymers, butadiene/acrylonitrile copolymers, polyamide resins, polyvinyl butyral, cellulose derivatives such as cellulose acetate butyrate, cellulose diacetate, cellulose triacetate, cellulose propionate, cellulose nitrate and the like, styrene/butadiene copolymers, polyester resins, chlorovinyl ether/acrylate copolymers, amino resins, various synthetic rubber based thermoplastic resins and mixtures thereof. Examples of these resins are described in Japanese Patent Publication Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972 and 27886/1973; U.S. Pat. Nos. 3,144,352, 3,419,420, 3,499,789, 3,713,887, etc.

Suitable thermosetting resins have a molecular weight of about 200,000 or less as a coating solution, and when heated after coating and drying, the molecular weight becomes infinity due to reactions such as condensation, addition and the like. Of these resins, preferred resins are those which do not soften or melt before the resin thermally decomposes. Representative examples of these resins are phenol resins, epoxy resins, polyurethane hardening type resins, urea resins, melamine resins, alkyd resins, silicone resins, acryl based reactive resins, mixtures of high molecular weight polyester resins and isocyanate prepolymers, mixtures of methacrylic acid salt copolymers and diisocyanate prepolymers, mixtures of polyesterpolyols and polyisocyanates, urea-formaldehyde resins, mixtures of low molecular weight glycols, high molecular weight diols and triphenylmethane triisocyanates, polyamide resins and mixtures thereof, etc. Examples of these resins are described in, for example, Japanese Patent Publication Nos. 8103/1964, 9779/1965, 7192/1966, 8016/1966, 14275/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/1972, 28922/1972, U.S. Pat. Nos. 3,144,353, 3,320,090, 3,437,510, 3,597,273, 3,781,210, 3,781,211, etc.

As the dispersing agent, there can be used fatty acids having 12 to 18 carbon atoms ($R_1COOH$ wherein $R_1$ is an alkyl group having 11 to 17 carbon atoms) such as capric acid, caprylic acid, lauric acid, myristic acid, palmitic acid, stearic acid, oleic acid, elaidic acid, linolic acid, linolenic acid and stearolic acid, metallic soaps such as alkali metal (Li, Na, K) salts or alkaline earth metal (Mg, Ca, Ba) salts of the above described fatty acids, lecitin, higher alcohols having 12 or more carbon atoms and their sulfuric acid esters. These dispersing agents are used preferably in a proportion of 1 to 20 parts by weight to 100 parts by weight of a binder. Examples of the dispersing agent are described in Japanese Patent Publication Nos. 28369/1964, 17945/1969 and 15001/1973 and U.S. Pat. Nos. 3,387,993 and 3,470,021.

As the lubricant, there can be used silicone oils, carbon black, graphite, carbon black-grafted polymers, molybdenum disulfide, tungsten disulfide, fatty acid esters of monobasic fatty acids having 12 to 16 carbon atoms and monohydric alcohols having 3 to 12 carbon atoms and fatty acid esters of monobasic fatty acids having 17 or more carbon atoms and monohydric alcohols having 21 to 23 carbon atoms with the number of carbon atoms of the fatty acids. These lubricants are preferably used in a proportion of 0.2 to 20 parts by weight to 100 parts by weight of a binder. These lubricants are mentioned in Japanese Patent Publication No. 23889/1968, Japanese Patent Application Nos. 81543/1968 and 28647/1967, U.S. Pat. Nos. 3,470,021, 3,492,235, 3,497,411, 3,523,086, 3,625,760, 3,630,772, 3,634,253, 3,642,539 and 3,687,725, "IBM Technical Disclosure Bulletin" Vol. 9, No. 7, page 779 (December 1966) and "ELECTRONIK" 1961, No. 12, page 380.

Examples of the organic solvent used in the coating or kneading are ketones such as acetone, methyl ethyl ketone, methyl isobutyl ketone and cyclohexanone, alcohols such as methyl alcohol, ethyl alcohol, propyl alcohol and butyl alcohol, esters such as methyl acetate, ethyl acetate, butyl acetate, ethyl lactate and glycol acetate monoethyl ether, ethers and glycol ethers such as ether, glycol dimethyl ether, glycol monoethyl ether and dioxane, aromatic hydrocarbons such as benzene, toluene and xylene and chlorinated hydrocarbons such as methylene chloride, ethylene chloride, carbon tetrachloride, chloroform, ethylene chlorohydrin and dichlorobenzene and their mixtures.

Formation of the magnetic recording layer is generally carried out by dissolving or dispersing the above described composition in an organic solvent and then coating the resulting solution or dispersion onto a support.

The support can be in any form of films, tapes, sheets, disks, drums, etc., and, depending upon such a form, various materials are chosen. The support has a thickness of generally about 2 to 100 microns, preferably 3 to 40 microns, which is made of polyesters such as polyethylene terephthalate, polyethylene-2,6-naphthalate and the like, polyolefins such as polypropylene and the like, cellulose derivatives such as cellulose triacetate, cellulose diacetate and the like and polycarbonates. Depending upon the object of use, moreover, non-magnetic metals such as copper, aluminum and zinc, glass, porcelain, earthenware and the like.

Coating of the above described magnetic recording layer onto a support is generally carried out by any commonly used method, for example, by air doctor coating, blade coating, air knife coating, squeese coating, immersion coating, reverse roll coating, transfer roll coating, gravure coating, kiss coating, casting coating or spray coating. Other coating methods can of course be employed. Details of these coating methods are described in "Coating Engineering" page 253 to 277, published by Asakura Books Co., Mar. 20, 1971.

As well known in the art, the magnetic layer thus coated onto a support is, if necessary, subjected to a treatment for the orientation of the magnetic powder and then dried, whereby the electromagnetic conversion characteristic for the recording direction is raised. This method has been put to practical use, examples of which are disclosed in Japanese Patent Publication Nos. 5350/1965, 23624/1965, 23626/1965, 2065/1966 and 21251/1968.

The above described non-magnetic support can be subjected to the so-called back coating of the surface opposite to that having the magnetic layer thereon for the purpose of preventing static charging, magnetic print through and so on in the case of a flexible support such as films, tapes, sheets, thin flexible disks, etc. Suitable back coating techniques which can be used are described in, for example, U.S. Pat. Nos. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420, 3,166,688 and 3,761,311.

A surface smoothening treatment after drying the foregoing magnetic layer is generally carried out by calendering after the coating and drying or by sheet smoothening before the coating and drying. This calendering is preferably carried out by the supercalendering method using two rolls of a metallic roll and cotton roll or synthetic resin roll such as nylon roll at a roll pressure of about 25 to 100 kg/cm$^2$, preferably 30 to 70

Kg/cm², a temperature of about 35° to 100° C., preferably 40° to 80° C. and a treatment speed of 5 to 120 m/min. If the temperature and pressure exceed these ranges respectively, the magnetic layer and non-magnetic support are unfavourably affected and if the treatment speed is less than 5 m/min, the effect of surface smoothening cannot be given, while if more than 120 m/min, the processing operation becomes difficult. Such a surface smoothening treatment is disclosed in, for example, U.S. Pat. Nos. 2,998,325, 2,688,567 and 3,783,023, DT-OS No. 2,405,222 and Japanese Patent Application (OPI) Nos. 53631/1974 and 10337/1975.

The present invention will be explained in detail with reference to the following examples. It will be obvious to one skilled in the art that various changes and modifications can be made in the components, ratios, operational order and the like without departing from the spirit of the present invention. Therefore, the present invention should not be construed as being limited to the following examples. All parts, percents, ratios and the like are by weight unless otherwise indicated.

EXAMPLE 1

The following composition was adequately mixed and dispersed to prepare a coating composition for the lower magnetic layer and coated onto a support of polyethylene terephthalate with a thickness of 12 μm to give a thickness of 5.8 μm on dry base, followed by drying and surface smoothening.

| | |
|---|---|
| Iron Oxide Magnetic Powder | 100 parts |
| Vinylidene Chloride Resin(Vinyl Chloride/Vinylidene Chloride: 87/13 mol %, Polymerization Degree: 4000) | 20 parts |
| Acrylic Acid Ester/Acrylonitrile Copolymer (Copolymerization Ratio: 6:4 molar ratio) | 15 parts |
| Dibutyl Phthalate | 2 parts |
| Lecitin | 1.5 parts |
| Carbon Black (Mean Particle Size: 40 μm) | 0.5 parts |
| Butyl Acetate | 250 parts |

Then a cobalt film with a thickness of 0.18 μm was formed by an oblique incidence vapor deposition with an electric field. 99.99% cobalt was charged in a hearth of 270° deflection type electron beam evaporation source and deposited on the above described magnetic layer by an oblique incidence vapor deposition in a vacuum of $2 \times 10^{-5}$ Torr and an electric field of 10 KV/m with an incident angle of 50°, 60° and 70°, thus obtaining respectively Samples A, B and C.

COMPARATIVE EXAMPLE 1

Onto the same polyethylene terephthalate support as that of Example 1 was coated a magnetic layer, on which 99.99% cobalt was vapor deposited from a high frequency induction heating type evaporation source in a vacuum of $2 \times 10^{-5}$ Torr with an incident angle of 50°, 60° and 70° to give a cobalt film of 0.18 μm in thickness by an oblique incidence vacuum vapor deposition method without electric field, thus obtaining respectively Samples D, E and F.

The adhesiveness of the ferromagnetic metal thin films of Samples A, B, C, D, E and F was examined by a Cellotape peeling test. The adhesive forces of these samples were respectively determined as a mean value of 20 measurements with 10 ranks of the results of the Cellotape peeling test, thus obtaining results shown in the following table. The larger is this value, the better is the adhesiveness. A magnetic recording medium, having a value of 6 or more, can be put to practical use.

Table 1

| Sample | Adhesive Force | Sample | Adhesive Force |
|---|---|---|---|
| A | 8.5 | D | 4.4 |
| B | 8.0 | E | 2.3 |
| C | 7.6 | F | 1.8 |

It is apparent from these results that the adhesive force is very excellent in the case of forming the upper layer by an oblique incidence vapor deposition with an electric field.

COMPARATIVE EXAMPLE 2

The composition of Example 1 was adequately mixed and dispersed to prepare a magnetic coating composition, coated onto a polyethylene terephthalate support with a thickness of 12 μm to give a coating thickness of 6.0 μm on dry base, dried and then subjected to a surface smoothening treatment to obtain a single layer magnetic recording medium, Sample G.

COMPARATIVE EXAMPLE 3

A cobalt film having a thickness of 0.40 μm was formed on a smooth polyethylene terephthalate support having a thickness of 16 μm by an oblique incidence vapor deposition method with an electric field. At this time, 99.99% cobalt was charged in a hearth of 270° deflection type electron beam evaporation source and deposited on the above described support by an oblique incidence vapor deposition in a vacuum of $2 \times 10^{-5}$ Torr and an electric field of 10 KV/m with an incident angle of 70°, thus obtaining Sample H.

Samples C, F, G and H were slit in a width of 3.81 mm and subjected to measurement of the electromagnetic properties as an audio tape according to the standard test method of sound cassette tapes, MTS-102, thus obtaining results tabulated below.

Table 2

| Sample | Magnetic Coercive Force (Oe) | Characteristics Residual Induction (Gauss) | Electromagnetic Sensitivity (dB) | Properties Frequency Characteristics (dB) | MOL (dB) |
|---|---|---|---|---|---|
| C | | | | | |
| upper layer | 540 | 15000 | 2.0 | 3.0 | 2.5 |
| lower layer | 270 | 1800 | | | |
| F | | | Measurement impossible due to peeling of ferromagnetic metal layer by magnetic head | | |
| upper layer | 450 | 14200 | | | |
| lower layer | 270 | 1800 | | | |
| G | 270 | 1800 | 0 | 0 | 0.2 |

Table 2-continued

| Sample | Magnetic Coercive Force (Oe) | Characteristics Residual Induction (Gauss) | Electromagnetic Sensitivity (dB) | Properties Frequency Characteristics (dB) | MOL (dB) |
|---|---|---|---|---|---|
| H | 540 | 15000 | −1.5 | 4.0 | −1.2 |

As apparent from these results, the multi-layer magnetic tape according to the present invention exhibits a good adhesiveness of the ferromagnetic metal layer and is more excellent in frequency characteristic and MOL (maximum output level) than the magnetic tape having a single coated magnetic layer and in sensitivity and MOL than the magnetic tape having a single ferromagnetic metal layer.

COMPARATIVE EXAMPLE 4

The following composition was adequately mixed and dispersed to prepare a magnetic coating composition and coated onto a support of polyethylene terephthalate with a thickness of 22 μm to give a thickness of 6 μm on dry base, followed by drying and surface smoothening.

| | |
|---|---|
| Iron Oxide Magnetic Powder | 100 parts |
| Vinylidene Chloride Resin (Vinyl Chloride/Vinylidene Chloride: 87/13 molar %, Polymerization Degree 400) | 20 parts |
| Polyesterpolyurethane (Molecular Weight:ca 30000, Reaction Product of Polyester from Adipic Acid, Diethylene Glycol and Butanediol with Diphenylmethane Diisocyanate) | 10 parts |
| Triisocyanate Compond (75% by weight Ethyl Acetate Solution of Reaction Product of 3 mols of Toluene Diisocyanate and 1 mol of Trimethylolpropane) | 5 parts |
| Dibutyl Phthalate | 2 parts |
| Lecitin | 2 parts |
| Butyl Acetate | 250 parts |

Thus Sample I was obtained.

EXAMPLE 2

Using the coating type magnetic recording medium prepared in Comparative Example 4 as a substrate, a Co-Ni-V film with a thickness of 0.10 μm was vapor deposited on this magnetic layer while changing the strength of the electric field. At this time, a Co-Ni-V alloy (Co:Ni:V=80:18:2 weight ratio) was vapor deposited from an electron beam evaporation source in a vacuum of $1\times10^{-5}$ Torr with an incident angle of 72° and an electric field of 0 KV/m (corresponding to the ordinary vacuum vapor deposition), 5 KV/m, 9 KV/m and 12 KV/m, thus obtaining respectively Samples J, K, L and M. The adhesive forces of these samples were measured to obtain the following results.

Table 3

| Sample | Adhesive Force |
|---|---|
| J | 1.8 |
| K | 6.2 |
| L | 7.2 |
| M | 8.5 |

As apparent from these results, the adhesive force is markedly excellent in the case of forming the upper layer by an oblique incidence vapor deposition with applying an electric field.

COMPARATIVE EXAMPLE 5

Using a smooth surface polyethylene terephthalate support having a thickness of 25 μm as a substrate in place of the substrate of Example 2, a Co-Ni-V film with a thickness of 0.25 μm was formed thereon by an oblique incidence vapor deposition method while applying an electric field of 9 KV/m, thus obtaining Sample N.

Samples I, L and N were slit respectively in a width of ½ inch to prepare magnetic tapes and then subjected to measurement of the electromagnetic properties using EIAJ (Electronic Industries Association of Japan) Type I VTR, thus obtaining results shown in the following table.

Table 4

| | Magnetic Characteristics | | Video Output (dB) | | |
|---|---|---|---|---|---|
| Sample | Coercive Force (Oe) | Residual Magnestic Induction (Gauss) | 1 MHz | 3 MHz | 7 MHz |
| I | 540 | 1020 | 0 | 0 | 0 |
| L upper layer | 830 | 10000 | | | |
| | | | 0.8 | 2.8 | 6.5 |
| lower layer | 540 | 1020 | | | |
| N | 830 | 10000 | −6.2 | −0.2 | 4.2 |

As apparent from the above described results, the multilayer magnetic tape according to the present invention exhibits a more excellent video output characteristic as well as a better adhesiveness as compared with the magnetic tape having a single coated magnetic layer or that having a single ferromagnetic metal layer.

What is claimed is:

1. A magnetic recording medium, which comprises a non-magnetic support, at least one magnetic recording layer containing a magnetic powder and a binder and being coated onto the support and a ferromagnetic metal thin film with a thickness of at most 1 micron, the ferromagnetic metal thin film being provided on the magnetic recording layer by the method of an oblique incidence vapor deposition with an electric field having a strength of at least 5 KV/$_m$ and in a vacuum of $10^{-4}$ to $10^{-7}$ Torr, the incident angle of evaporation being at least 50 degrees.

2. The magnetic recording medium as claimed in claim 1, wherein the non-magnetic support has a thickness of 2 to 100 microns.

3. The magnetic recording medium as claimed in claim 1, wherein the magnetic powder is selected from the group consisting of fine powders of $\gamma$-$Fe_2O_3$, Co-doped $\gamma$-$Fe_2O_3$, $Fe_3O_4$, Co-doped $Fe_3O_4$, $CrO_2$, Co-Ni-P alloys and Co-Ni-Fe alloys.

4. The magnetic recording medium as claimed in claim 1, wherein the binder is selected from the group consisting of thermoplastic resins and thermosetting resins.

5. The magnetic recording medium as claimed in claim 1, wherein the magnetic recording layer further contains dispersing agents and lubricants.

6. The magnetic recording medium as claimed in claim 1, wherein the magnetic recording layer is formed by coating onto the non-magnetic support a magnetic powder, binder, dispersing agent and lubricant with an organic solvent.

7. The magnetic recording medium as claimed in claim 6, wherein the organic solvent is selected from the group consisting of ketones, alcohols, esters, glycol ethers, aromatic hydrocarbons and chlorinated hydrocarbons.

8. The magnetic recording medium as claimed in claim 1, wherein the ferromagnetic metal to be vapor deposited is selected from the group consisting of iron, cobalt, nickel, Fe-Co, Fe-Ni, Co-Ni, Fe-Si, Fe-Rh, Fe-V, Fe-Cu, Fe-Au, Co-P, Co-V, Co-Si, Co-Y, Co-La, Co-Ce, Co-Pr, Co-Sm, Co-Mn, Co-Pt, Ni-Cu, Co-Ni-Fe, Co-Ni-Ag, Co-Ni-Zn, Co-Si-Al, Fe-Ni-Cu, Fe-Si-Al, Mn-Bi, Mn-Sb, and Mn-Al.

9. The magnetic recording medium as claimed in claim 1, wherein the ferromagnetic metal thin film has a thickness of 0.03 to 1 $\mu$m.

10. The magnetic recording medium as claimed in claim 1, wherein the multiple magnetic recording layer has a total thickness of 1 to 12 $\mu$m.

11. The magnetic recording medium as claimed in claim 1, wherein the non-magnetic support is of a material selected from the group consisting of polyesters, polyolefins, cellulose derivatives, polycarbonates, non-magnetic metals and ceramics.

12. The recording medium of claim 11 wherein said polyesters are selected from the group consisting of polyethylene terephthalate, polyethylene-2,6-naphthalate and polybutylene terephthalate.

13. The recording medium of claim 11 wherein said polyolefins are selected from the group consisting of polyethylene and polypropylene.

14. The recording medium of claim 11 wherein said cellulose derivatives are selected from the group consisting of cellulose triacetate and cellulose diacetate.

15. The recording medium of claim 11 wherein said non-magnetic metals are selected from the group consisting of copper, aluminum and zinc.

16. The recording medium of claim 11 wherein said ceramics are selected from the group consisting of glass, porcelain and earthenware.

* * * * *